(12) United States Patent
Ducasteele et al.

(10) Patent No.: US 11,635,677 B2
(45) Date of Patent: Apr. 25, 2023

(54) TENSIONED PROJECTION SCREEN (71) Applicant: BARCO N.V., Kortrijk (BE)

(72) Inventors: Stefaan Ducasteele, Zonnebeke (BE); Nursen Avci, Kortrijk (BE); Johan Cyriel Decock, Zwevegem (BE)

(73) Assignee: BARCO N.V., Kortrijk (BE)

( * ) Notice: Subject to any disclaimer, the term of this patent is extended or adjusted under 35 U.S.C. 154(b) by 124 days.

(21) Appl. No.: 17/259,236

(22) PCT Filed: Jul. 15, 2019

(86) PCT No.: PCT/EP2019/069050
§ 371 (c)(1),
(2) Date: Jan. 11, 2021

(87) PCT Pub. No.: WO2020/012041
PCT Pub. Date: Jan. 16, 2020

(65) Prior Publication Data
US 2021/0294197 A1 Sep. 23, 2021

(30) Foreign Application Priority Data

Jul. 13, 2018 (GB) .................................... 1811560

(51) Int. Cl.
*G03B 21/56* (2006.01)
*G03B 21/58* (2014.01)
(Continued)

(52) U.S. Cl.
CPC .............. *G03B 21/56* (2013.01); *G03B 21/58* (2013.01); *G03B 21/60* (2013.01); *G03B 21/62* (2013.01); *G03B 21/625* (2013.01)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 2,914,776 A * 12/1959 Hotz ....................... E04H 15/22
52/273
3,719,341 A * 3/1973 Harrington ............. E04G 11/04
52/2.17
(Continued)

FOREIGN PATENT DOCUMENTS

| CN | 206920811 U | 1/2018 |
| FR | 2831582 A1 | 5/2003 |
| WO | 2016128474 A1 | 8/2016 |

OTHER PUBLICATIONS

ISR and Written Opinion in corresponding PCT Application No. PCT/EP2019/069050 dated Oct. 9, 2019.
(Continued)

*Primary Examiner* — Clayton E. LaBalle
*Assistant Examiner* — Kevin C Butler
(74) *Attorney, Agent, or Firm* — Hamre, Schumann, Mueller & Larson, P.C.

(57) ABSTRACT

A projection screen apparatus and method of making the same. The apparatus has a perimeter frame and a projection screen where the perimeter frame includes an upper frame member, a lower frame member, a left frame member and a right frame member, where at least two of the frame members have a groove or track. The projection screen has fastening edges on at least two opposite sides for fastening the projection screen to the perimeter frame by inserting the fastening edge in the groove or track of a frame member. An auxiliary element is inserted in the groove or track next to a fastening edge, to prevent the fastening edge from exiting the groove.

21 Claims, 10 Drawing Sheets

(51) Int. Cl.
*G03B 21/625* (2014.01)
*G03B 21/62* (2014.01)
*G03B 21/60* (2014.01)

(58) Field of Classification Search
USPC ......................................................... 359/443
See application file for complete search history.

(56) References Cited

U.S. PATENT DOCUMENTS

| | | | | |
|---|---|---|---|---|
| 3,811,454 A * | 5/1974 | Huddle | ................ | E04H 15/646 |
| | | | | 52/63 |
| 4,329,716 A * | 5/1982 | Porco | .................... | G03B 21/62 |
| | | | | 348/786 |
| 4,887,626 A * | 12/1989 | Dalo | .................... | E04H 15/644 |
| | | | | 135/907 |
| 6,318,255 B1 * | 11/2001 | Larson | .................... | B41F 15/36 |
| | | | | 101/127.1 |
| 6,785,047 B1 * | 8/2004 | Risher | .................... | G03B 21/58 |
| | | | | 359/443 |
| 7,752,963 B1 * | 7/2010 | Niswonger | ............. | B41F 15/36 |
| | | | | 101/127.1 |
| 8,941,917 B2 * | 1/2015 | Enochs | ................ | G03B 21/56 |
| | | | | 40/741 |
| 9,612,517 B2 | 4/2017 | Enochs | | |
| 2008/0094698 A1 * | 4/2008 | Enochs | ................ | G03B 21/56 |
| | | | | 359/443 |
| 2008/0285126 A1 * | 11/2008 | Bartle | .................... | G03B 21/58 |
| | | | | 359/450 |
| 2010/0053748 A1 * | 3/2010 | Rohner | ................ | G03B 21/62 |
| | | | | 428/68 |
| 2011/0239560 A1 * | 10/2011 | Landeros | ................ | E06B 3/549 |
| | | | | 52/656.2 |
| 2012/0138242 A1 * | 6/2012 | Kondash | ............ | E05D 15/0621 |
| | | | | 160/202 |
| 2013/0271831 A1 | 10/2013 | Enochs | | |

OTHER PUBLICATIONS

Office Action issued corresponding Chinese Application No. 201980047088.3, dated Aug. 10, 2021, 16 pages provided.
International Preliminary Report on Patentability in corresponding PCT Application No. PCT/EP2019/069050, dated Jan. 28, 2021.
Office Action issued in corresponding Chinese Application No. 201980047088.3, dated Feb. 17, 2022, with machine translation, 49 pages provided.

* cited by examiner

SECTION A-A

Fig. 9B

DETAIL B
SCALE 4/1

Fig. 9C

DETAIL C
SCALE 8/1

Fig. 9E

SECTION A-A
SCALE 2/1

Radius
R=0.5
0 R=1

TENSIONED PROJECTION SCREEN

The present invention relates to a tensioned projection screen, and to a method of making and installing such a screen, as well as to a kit of parts from which a tensioned projection screen can be constructed.

BACKGROUND

Tensioned projection screens are known from the art.

For instance, U.S. Pat. No. 8,941,917 "Tensioned projection screen" describes a projection screen apparatus wherein the projection screen comprises a perimeter frame including side members and a substantially blank screen tensioned on the perimeter frame. The screen has a substantially flat display portion and a perimeter portion coupled to the perimeter frame. The side members include a tube portion and a track extending from the tube portion. The track receives the perimeter portion therein.

Figure 1:
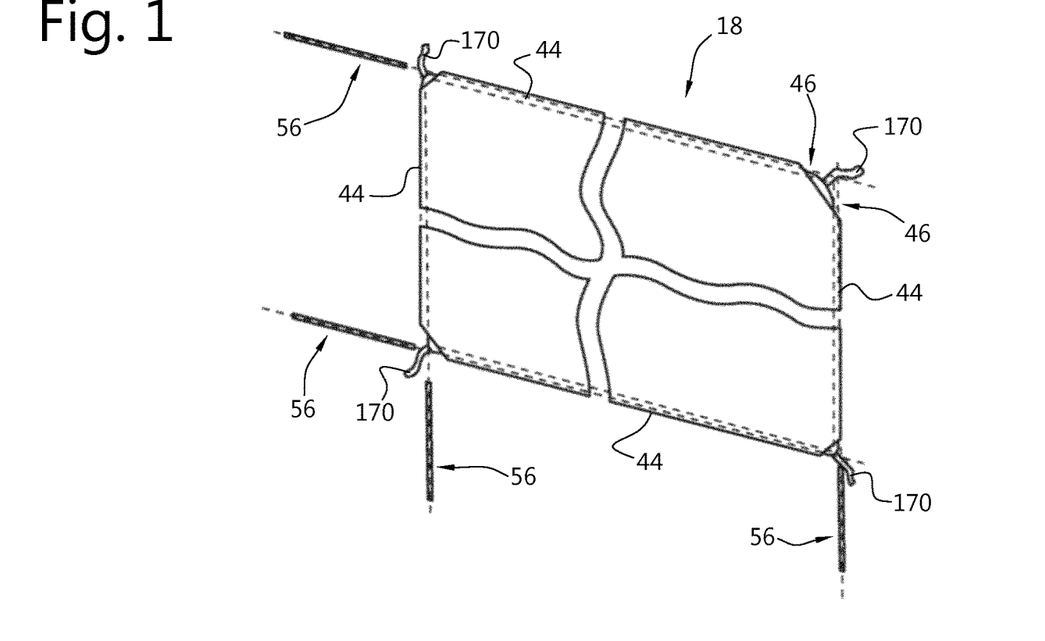
FIG. 1 shows an overview of a projection screen according to the art.
Figure 2:
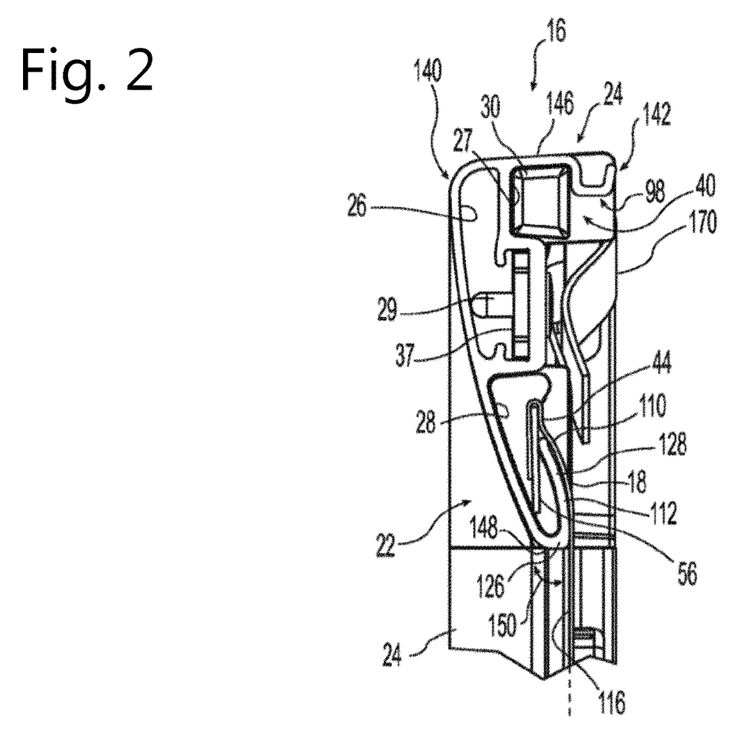
FIG. 2 shows a detail of fastening means to fasten a projection screen to a support frame according to the art.

FIG. 1 shows a perspective view of key elements of such a projection screen and FIG. 2 shows a cross-section through a frame. A screen 18 is held relative to the frame with straps 170. Rods 56 are positioned in tracks 28. To position rod 56 in track 28, the screen 18 is slightly stretched until a portion of track 28 is trapped between screen 18 and rod 56. As seen on FIG. 2, because a rod 56 is wider than a track 28, it will not rotate out of track 28 and the tension provided by screen 18 pulls rod 56 inward toward the center of screen 18.

The art suffers from shortcomings.

Positioning the rod 56 in track 28 is not easy for a large projection screen. The larger the screen, the larger the total force required to stretch the screen, i.e. to tension it. The art remains silent on how to adjust the tension in the screen.

Figure 3:
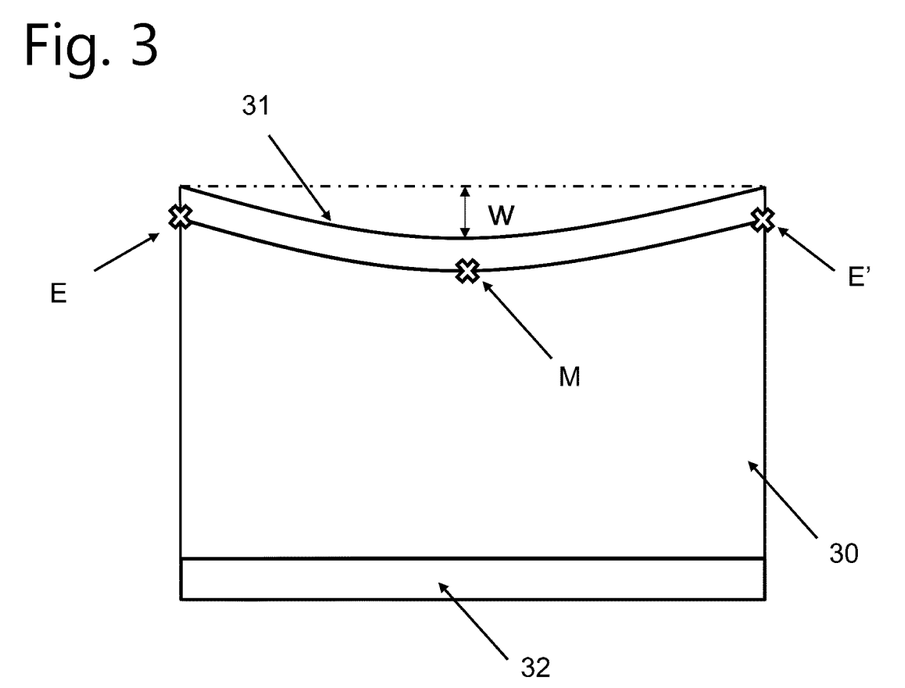
FIG. 3 illustrates how the stress can vary from one point of the projection screen to another when the support structure is strained by, for example, its own weight and/or the stressed projection screen.

The geometry of the frame and/or the tracks may be affected by tolerances. The frame and/or the edges of a track can also be deformed by the stress applied by the tensioned screen. Because of this, the stress will not necessarily be the same across the projection screen as illustrated on FIG. 3. FIG. 3 shows an example where a screen 30 is stretched between an upper frame member 31 and a lower frame member 32. The upper frame member is deformed more than the lower frame member due to gravity. Instead of being straight, the upper frame member is bent, the deflection w being e.g. maximum at its center. In the example of FIG. 3, the stress in the screen will be lower around the point M than at the extremities E and E'. Stress variation across the projection screen may result in visual artefacts.

WO2016/128474A1 "Load leveling apparatus for tiled displays and related methods" describes an apparatus that will re-distribute the load across a tiled display in function of e.g. the difference in height between pick-up-points (the pick-up points being the points at which the display tiles are suspended to a support structure). This solution requires a dedicated mechanism not necessarily compatible with the support structure of a projection screen. Furthermore, a projection screen is a membrane that is best tensioned all along its edges and not only at a limited number of points. This is not compatible with the solution described in WO2016/128474A1.

The art needs to be improved.

SUMMARY OF THE INVENTION

In a first aspect of the invention, a projection screen apparatus comprises a perimeter frame and a projection screen. The projection screen is preferably a rear projection screen. The perimeter frame can be made of several frame members, e.g. at least four. These can be an upper frame member, a lower frame member, a left frame member and a right frame member, for example. Each frame or element of a frame can be made of more than one piece. This can reduce transportation cost. For example, if the screen width is 6 m and the height is 3 m, the upper and lower frame members can each be cut into two pieces which fit together to make each of the upper and lower frame members.

At least two of the frame members have a groove or track. The frame preferably has a polygonal shape such as a square or an oblong. The projection screen has fastening edges on at least two opposite sides for fastening the projection screen to the perimeter frame by inserting the fastening edge in the groove or track of a frame member. An auxiliary element can be inserted in the groove next to the fastening edge and holds the edge of the projection screen in place. The auxiliary element can prevent the fastening edge from exiting the groove or reduces the possibility of this.

It is an advantage of that aspect of the invention that it facilitates the fastening of the projection screen to the perimeter frame. Indeed, the fastening edge can be inserted in the groove from a direction perpendicular to the plane of the perimeter frame. This is even more advantageous for large projection screens.

Straps can be distributed along the edge of the projection screen for temporarily hanging the projection screen to the perimeter frame and keeping it in place while the fastening edge and auxiliary element are inserted in the groove of a frame member.

In a further aspect of the invention, the fastening edge of the projection screen comprises an elongate bead of wire or plastic encapsulated in a length of fabric disposed along an edge of the projection screen and securely attached to the fabric or projection screen. The material with which the elongated bead of wire or plastic is made, can be compressible enough to press the fastening edge into the track or groove. The fastening edge diameter can be the same as or smaller than the track or groove opening, so that bead of wire or plastic in the fastening edge need not be compressible, it can be even rigid. However, preferably, the fastening edge and the wire or plastic should have the ability to absorb a certain tensile strain (e.g. elongation or extension) which is similar to the ability of the screen material to absorb a certain tensile strain, i.e. matched to the screen material. An auxiliary element is provided to fasten the fastening edge. L-shaped brackets can be used all along the frame for this purpose.

Alternatively, the track or groove has an opening wide enough to let the fastening edge in. The auxiliary element will secure the fastening edge in the track in both cases.

In a further aspect of the invention, the auxiliary element is a cylinder of compliant material. An advantage of that aspect of the invention is that it can make the assembly process easier. Indeed, positioning a compressible material in the groove or track can be easier to perform.

Another advantage of that aspect of the invention is that a compressible auxiliary element can compensate for tolerances or deformations affecting the frame member, thereby decreasing differences in (mechanical) tension across the edge of the projection screen and across the projection screen itself.

The auxiliary element can e.g. be made of a suitable compressive material such as an elastomer or a rubber. The auxiliary element can be made, for example, of polyurethane. Another example is that the auxiliary element can be made of rubber. The modulus of elasticity (E-modulus) can be determined by tensile testing according to DIN EN ISO 527-1A, using a test specimen at a testing speed of 1 mm/min. A suitable range showing rubber like properties is 1 to 10 MPa. The auxiliary element can be, for example, cylinder-shaped and can be hollow or full, i.e. no opening in the core of the auxiliary element. A hollow cylinder or pipe is expected to be more compliant and easier to position in the groove than a full cylinder made of the same material. The compressive material which forms the auxiliary element can also be a spring loaded material whereby the force required to deform the spring fastens the fastening edge.

To compensate for tolerances or deformations of the frame member, the auxiliary element is preferably closer to the center of the projection screen than the fastening edge which is in the same track or groove. In particular, the auxiliary element is pressed against a wall or edge of the groove or track by the fastening edge.

In a further aspect of the invention, at least each frame member of a pair of frame members opposite to each other has an adjustment mechanism to adjust the total length of the frame member. This adjustment can be used to put the projection screen under tension or to alter its tension. It is an advantage of that aspect of the invention that the tension can be adjusted to tension the screen once it has been fastened to the perimeter frame. When the upper edge of the projection screen is fastened to the upper frame member of the perimeter frame, the tension in the screen can already be too high when trying to stretch and fasten the lower edge of the projection screen to the lower frame member. To make assembly easier, the total length of the right and left frame member can be decreased with an adjustment mechanism (by decreasing the distance between a first and second part of the frame members). Once the fastening edge along the lower edge of the projection screen has been inserted in the groove or track of the lower frame member, the distance between a first and second part of the frame members of the right and left frame members can be increased to tension the projection screen using the adjustment mechanism.

The adjustment mechanism can, for instance, comprise a first and a second threaded part.

The thread in the first part and the thread of the second part of the adjustment mechanism are oriented so that when the first and second part rotate together, both will be pulled into or pushed out of threaded holes in the first and second part of a frame member.

The first and second parts can be rotated by e.g. engaging a lever in an opening situated between the first part and the second part of the adjustment mechanism and by applying a force on the lever.

In another aspect of the present invention, a method of making a projection screen apparatus is disclosed, the method comprising:

obtaining a perimeter frame and a projection screen, wherein the perimeter frame includes an upper frame member, a lower frame member, a left frame member and a right frame member, forming in at least two of the frame members a groove or track, wherein the projection screen has fastening edges on at least two opposite sides, the method comprising fastening the projection screen to the perimeter frame by inserting the fastening edge in the groove or track of a frame member, and inserting an auxiliary element in the groove or track next to a fastening edge, to prevent the fastening edge from exiting the groove. The auxiliary element can be a cylinder of compliant material, for example. The auxiliary element can be made of polyurethane or of rubber, for example. The modulus of elasticity (E-modulus) can be determined by tensile testing according to DIN EN ISO 527-1A, using a test specimen at a testing speed of 1 mm/min. A suitable range showing rubber like properties is 1 to 10 MPa.

The method can include hanging the projection screen to the upper frame member of the perimeter frame using at least two straps on an edge of the projection screen.

The method may include securely attaching the fabric or projection screen to the fastening edge of the projection screen using an elongate bead of wire or plastic encapsulated in a length of fabric disposed along an edge of the projection screen.

The method can include forming the groove or track with a width that is the same as or larger than a width of the wire or plastic of the fastening edge.

The method can comprise adjusting the total length of the frame member and the tension in the projection screen.

At least a pair of frame members opposite to each other can have an adjustment mechanism.

In another aspect, a method of constructing a projection screen on site is provided, wherein a perimeter frame is provided as a kit of parts with a projection screen. The perimeter frame can include an upper frame member, a lower frame member, a left frame member and a right frame member, whereby in at least two of the frame members there is a groove or track. The projection screen can be provided with fastening edges on at least two opposite sides, and the projection screen can be fastened to the perimeter frame by inserting the fastening edge in the groove or track of a frame member. Alternatively, in all frame members, such as in all four of the frame members, there is a groove or track, i.e. in all frame pieces. If other frame shapes are used, such as a polygon, every side of the frame can have a groove or track.

An auxiliary element can be inserted in the groove or track next to a fastening edge, to prevent the fastening edge from exiting the groove.

In another aspect, a kit of parts is provided comprising a projection screen apparatus, the kit comprising a perimeter frame and a projection screen, wherein the perimeter frame includes an upper frame member, a lower frame member, a left frame member and a right frame member, wherein at least two of the frame members have a groove or track, wherein the projection screen has fastening edges on at least two opposite sides for fastening the projection screen to the perimeter frame by inserting the fastening edge in the groove or track of a frame member, and the projection screen apparatus being characterized in that an auxiliary element can be inserted in the groove or track next to a fastening edge, to prevent the fastening edge from exiting the groove or track.

BRIEF DESCRIPTION OF THE FIGURES

FIG. 9 (consisting of FIGS. 9A to 9E) shows the cross section of an example of extruded truss that can be used for the frame that will support the projection screen according to an embodiment of the present invention.

DEFINITIONS AND ACRONYMS

Compressible. Capable of being compressed or squeezed, reduced in size and particularly volume when subjected to a compressive force.

Squeeze. Squeeze is a ratio of the amount of deformation applied to e.g. a cylindrical or toroidal volume of compressible material, like e.g. an elastomer, expressed as a percentage of the nominal (*) cross-sectional thickness (* when no force outside of its own weight is applied to the material). When deforming the cross-section of the compressible material, it behaves much like a compressed spring; the inherent elasticity of the rubber material causes it to push back against the mating components. The greater the squeeze, the more force is applied against the hardware Keder edge.

A Keder edge 40 (well known to those skilled in the art) comprises an elongate bead (or rope or rod or cord) of wire or plastics 41 encapsulated in a length of fabric (with flaps) 42 disposed along an edge of a section of fabric material 43, this producing a bulbous edge portion, securely attached to the fabric (e.g. by stitching, knitting, gluing . . . ).

The fabric material 43 is attached to a support structure 44 by sliding its Keder edge into a groove or track 45 on the support structure. The Keder edge and the groove must all be shaped and dimensioned such that the section of fabric material can slide longitudinally of the support structure but cannot be pulled away from it. This is illustrated on FIG. 4.

DETAILED DESCRIPTION OF THE INVENTION

A first aspect of the present invention (see FIGS. 5 to 7 and 14, for example), relates to how a fabric is attached to a frame to form a projection screen, preferably a rear projection screen. For example, a fastening edge 50 comprises an elongate bead (or rope or rod or cord) of wire or plastics 51 encapsulated in a length of fabric such as with flaps 52 disposed along an edge of a section of fabric material 53 and securely attached to the fabric or projection screen 153 (e.g. by stitching, knitting, gluing . . . ).

The fabric material which can be used as a projection screen 153, especially a rear projection screen or optionally a front projection screen, is attached to a support structure 54 by inserting its fastening edge into a groove or track 55 on the support structure 54. The insertion is done in a direction (N on FIG. 5) perpendicular to the support structure.

In any of the embodiments of the present invention, the fabric 53 or the projection screen 153 can be made from a screen material such as used in screen printing, e.g. a silk screen fabric.

The fabric 53 or the projection screen 153 can be made e.g. from metal threads or fibres, synthetic threads or fibres, or mineral threads or fibres such as glass fibre. The fabric can be non-woven or woven. The fabric 53 or projection screen 153 can be coated or impregnated.

Figure 5:
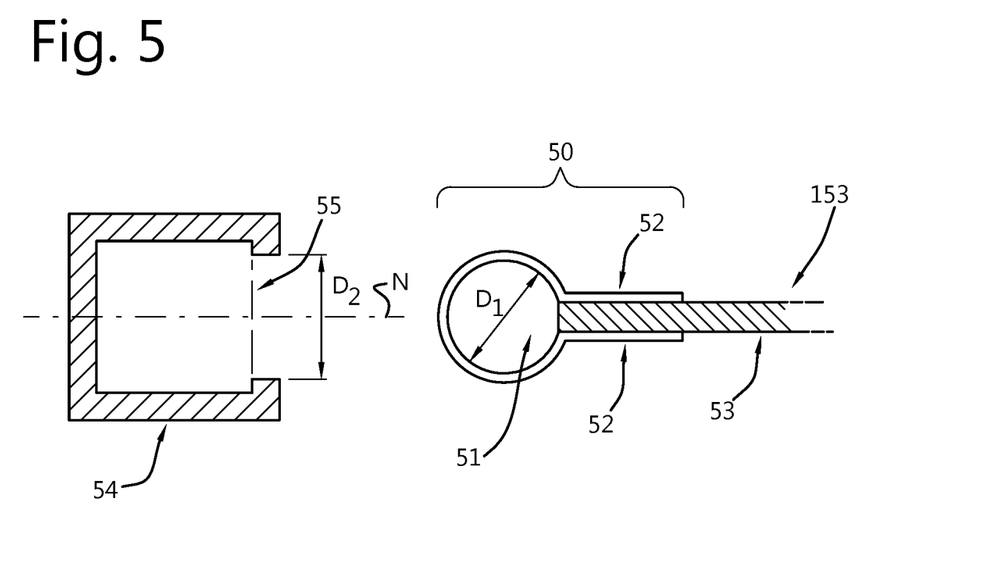
FIG. 5 shows an example of fastening means according to an embodiment of the present invention to fasten a tensioned screen to a support structure. The screen material can be stitched and the Keder materials can be glued to each other, for example.

The track can have e.g. a square cross section as illustrated in FIG. 5.

Figure 4:
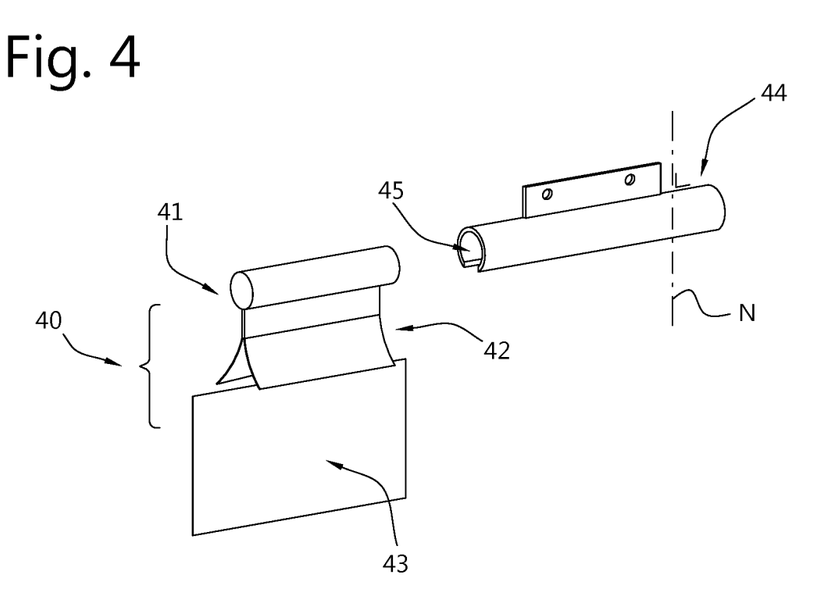
FIG. 4 shows an example of Keder edge according to the art.

Contrarily to what is done in the prior art, the fastening edge and the groove can be pulled away when a force is exerted perpendicularly to the groove (i.e. along the direction N as indicated on FIGS. 4 and 5). For instance, if the cord 51 used for the fastening edge 50 has a diameter D1, the opening D2 of the track 55 is larger than D1 (D2>D1). It is understood that the diameter D1 includes the thickness of the fabric (if present) encapsulating the cord. If the cord 51 is sufficiently elastic, the diameter D1 can be equal to D2 or even slightly larger than D2 as long as the force required to disengage the fastening edge 50 from the groove 55 is not excessive (for instance, it does not lead to permanent damages to e.g. the flaps 52 or the projection screen 153).

The diameter (D1) of the cord 51 can be in the range of 3 to 12 mm, e.g. 6.5 mm. The dimension D2 is the width of the opening through which the cord 51 is stuffed and the width of the opening of the groove (D2) can be in the range 5 to 15 mm, e.g. 8.5 mm.

Figure 6:
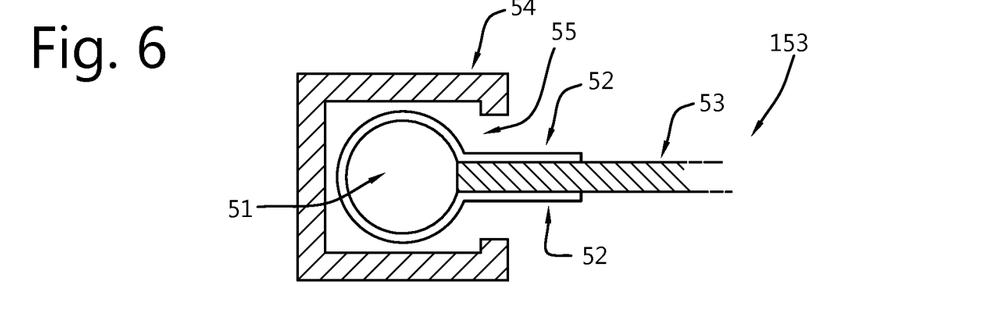
FIG. 6 shows a cross section of the support structure with the cord of the fastening edge inserted in the groove according to an embodiment of the present invention.

FIG. 6 shows a cross section of the support structure with the cord of the fastening edge 50 inserted in the groove 55.

An auxiliary element 56 is preferably provided to prevent the fastening edge 50 from exiting the track 55. The outer diameter D3 of the auxiliary element 56 can be 4 to 12 mm, such as 8 mm. D3 can be the same or smaller than D2. If it is a tube, the inner diameter of the tube can be 3 to 10 mm, such as 5.5 mm. If it is a tube, the ratio of outer diameter to inner diameter can be in the range 1.2 to 2 for example, such as 1.3 to 1.8.

Preferably: D1+D3>D2.

Figure 7:
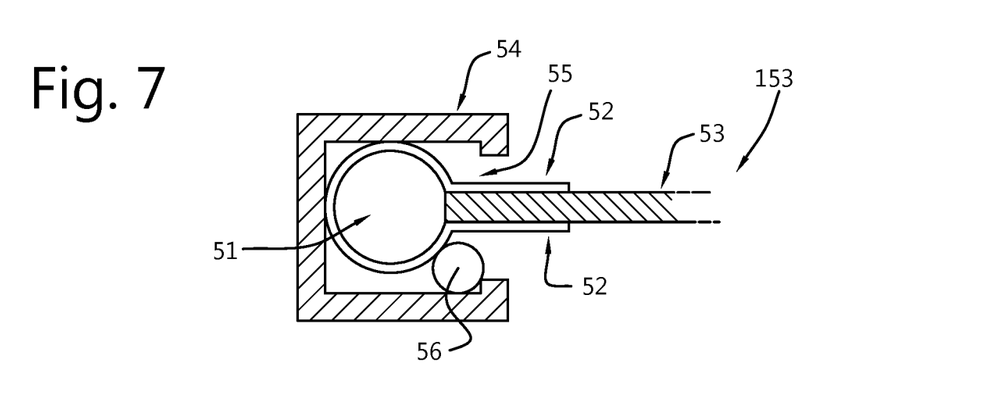
FIG. 7 shows a cross section of the support structure with the cord of the fastening edge inserted in the groove as well as the auxiliary element that prevents the cord of the fastening edge to exit the groove according to an embodiment of the present invention.
Figure 13:
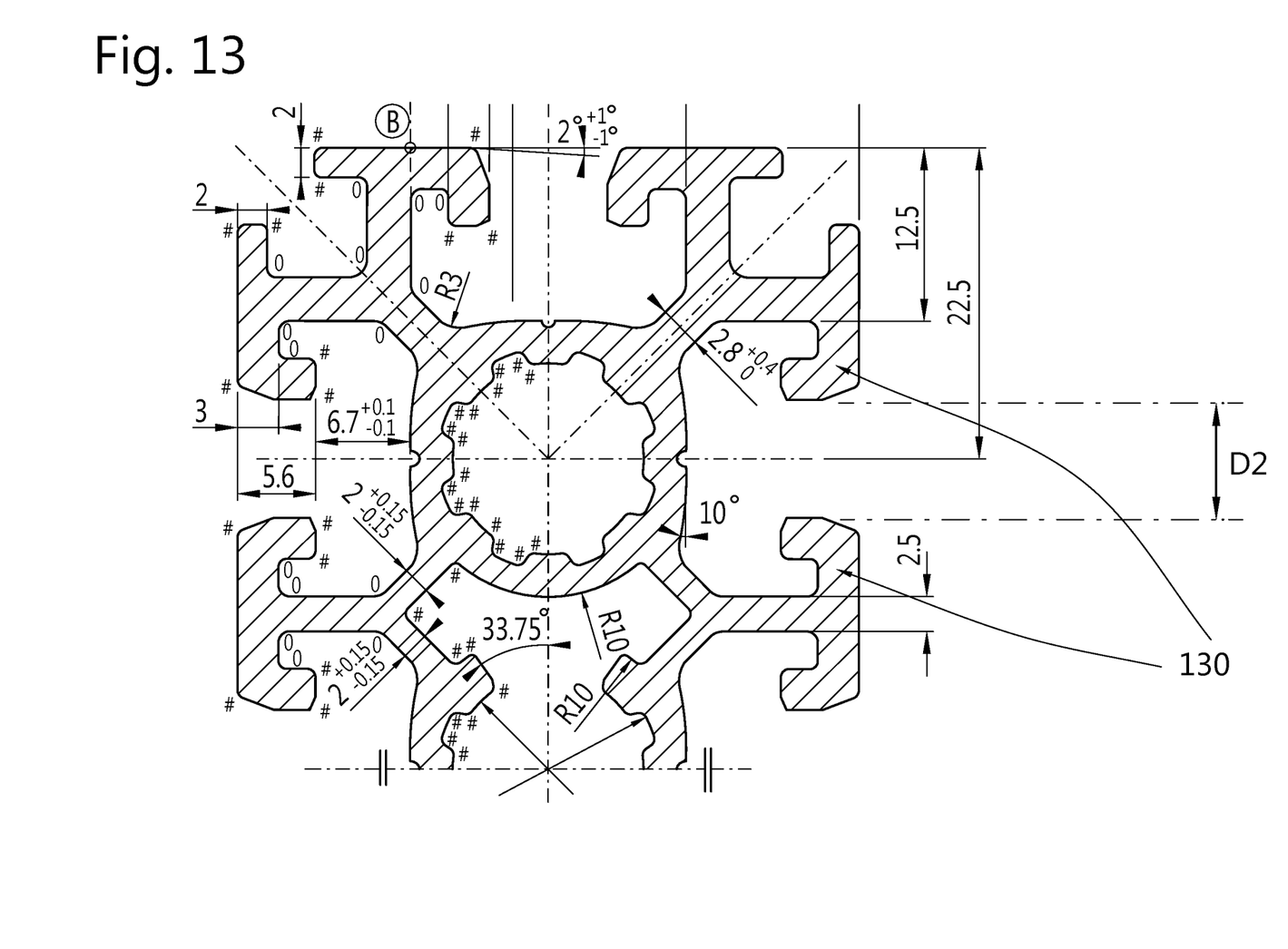
FIG. 13 shows a cross section with an opening of a groove bordered by a ridge or cornice.

As seen on FIGS. 5, 6 and 7, the width D2 of the groove can be smaller than an inner dimension of the groove. For instance, it the cross section of the groove is a square, D2 can be smaller than the side of the square. The opening of the groove can for instance be bordered by a ridge or cornice 130 as also seen on FIG. 13.

The auxiliary element 56 can be a flexible cylinder like e.g. a flexible rubber pipe with a diameter D3. The diameter D3 is preferably the same as or smaller than D2 to facilitate the introduction of the auxiliary element 56 in the track 55.

FIG. 7 shows a cross section of the support structure with the cord of the fastening edge inserted in the groove 55, as well as the auxiliary element 56.

In the example of FIG. 7, the auxiliary element 56 will keep the cord 51 in the groove 55 provided that one or more of the following conditions are met:
(a) D1+D3>D2
(b) The cord 51 and the auxiliary element 56 are pressed against each other and by the walls of the groove 55.

When the screen is pulled or tensioned, a force F is transmitted to the cord 51. At least one component of the force is along the direction N and tends to dislodge the cord 51 from the groove 55. If the diameter of the cord D1 is larger than the opening, the cord will remain in the groove until the tension in the screen is (a) either large enough to compress and deform the cord so that its diameter under compression is small enough to pass through the opening of the groove or (b) tears the screen.

By using an auxiliary element 56, the force required to deform the cord 51 and force it through the opening of the groove is expected to be larger than if no auxiliary element is used. This is the case in particular when the auxiliary element is compressible. The cord 51 presses against the auxiliary element that is in turn pressed against the walls of the groove 55, as seen e.g. on FIG. 7. The auxiliary element 56 remains in place and presses against the cord 51, preventing it from being dislodged from the groove 55. If the auxiliary element is compressible (i.e. can be squeezed), some of the work done by the force in the screen and transmitted to the cord and the auxiliary element will be used to deform the auxiliary element 56, to squeeze the auxiliary element 56 and not the cord 51. Because of this, a larger force will be required to pull the cord out of the opening 52 with a compressible auxiliary element than without auxiliary element.

In addition, the auxiliary element 56 being compliant, it can help to distribute stress in the fabric equally along the edge of the projection screen. This is illustrated on FIG. 8. The auxiliary element 56 can be used to fix the screen to the frame. Homogenous distribution of the stress can be obtained with straight frame members and a fastening edge.

Figure 14:
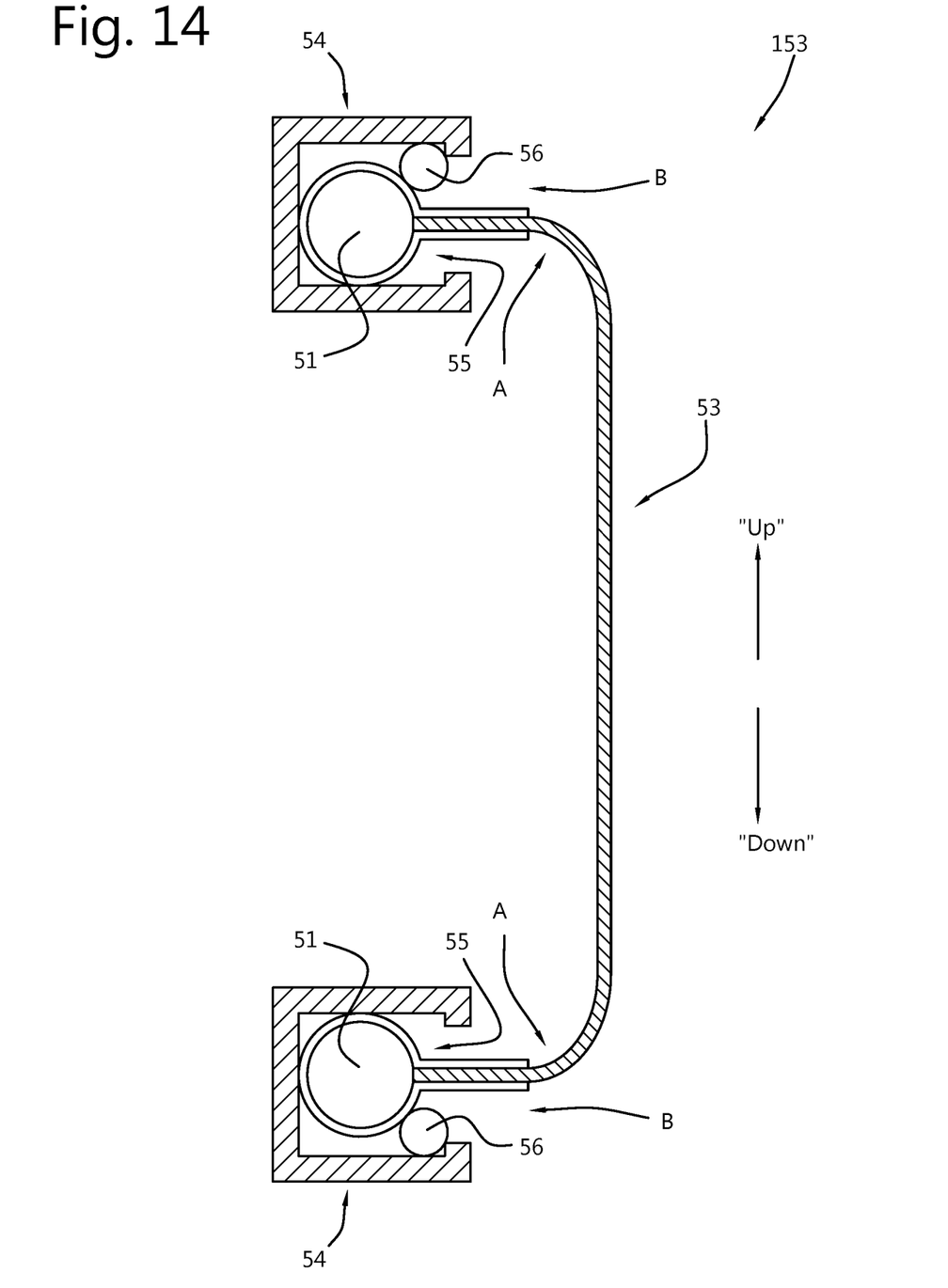
FIG. 14 shows a cross section of upper and lower support structures with a fabric connected therebetween, wherein the cord of the fastening edge is inserted in the groove of both of these support structures as well as the auxiliary element being easily inserted in the groove from the front of the projection screen so that the cord of the fastening edge is prevented from exiting the groove according to another embodiment of the present invention.

FIG. 14 shows a cross section of a support structure with the cord of the fastening edge inserted in the groove 55 as well as the auxiliary element 56. The same comments apply to FIG. 14 as to FIGS. 7 to 9.

In the example of FIG. 14 as well as of FIG. 7, the auxiliary element 56 will keep the cord 51 in the groove 55 provided that one or more of the following conditions are met (see FIG. 5):
(a) D1+D3>D2
(b) The cord 51 and the auxiliary element 56 are pressed against each other and by the walls of the groove 55.

The diameter (D1) of the cord 51 can be in the range 3 to 12 mm, e.g. 6.5 mm. The dimension D2 is the width of the opening through which the cord 51 is stuffed and the width of the opening of the groove (D2) can be in the range 5 to 15 mm, e.g. 8.5 mm.

An auxiliary element 56 is preferably provided to prevent the fastening edge from exiting the track 55. The outer diameter D3 of the auxiliary element 56 can be 4 to 12 mm, such as 8 mm. D3 can be the same or smaller than D2. If it is a tube the inner diameter of the tube can be 3 to 10 mm, such as 5.5 mm. If it is a tube, the ratio of outer diameter to inner diameter can be in the range 1.2 to 2, for example, such as 1.3 to 1.8.

The auxiliary element 56 can be introduced into the groove 55 from the front of the projection screen along direction B (FIG. 14). In the groove 55 in the upper frame member, the auxiliary element 56 is located between the upper side of upper flap 52 and the inner surface of the support structure 54. It is easy during installation to insert the auxiliary element 56 in this manner along direction B as there is free access to the upper part of groove 55 from the front of the projection screen. Similarly, the auxiliary element 56 can be inserted into the lower part of groove 55 in the lower support structure 54 along the direction B. It is easy during installation to insert the auxiliary element 56 in this manner as there is free access to the lower part of groove 55 in the lower support structure 54 from the front of the projection screen.

Attempting to insert the auxiliary element 56 in the lower part of groove 55 of the upper support structure 54 (or in the upper part of groove 55 of the lower support structure 54) along direction A would have to be performed from the back of the projection screen. There may be restricted access to the back, making this manner of inserting the auxiliary element 56 less preferred.

The auxiliary element 56 being compliant, it can help to distribute stress in the fabric 53 equally along the edge of the projection screen 153. This is illustrated on FIG. 8. The auxiliary element can be used to fix the screen to the frame. Homogenous distribution of the stress can be obtained with straight frame members and a fastening edge.

Figure 8:
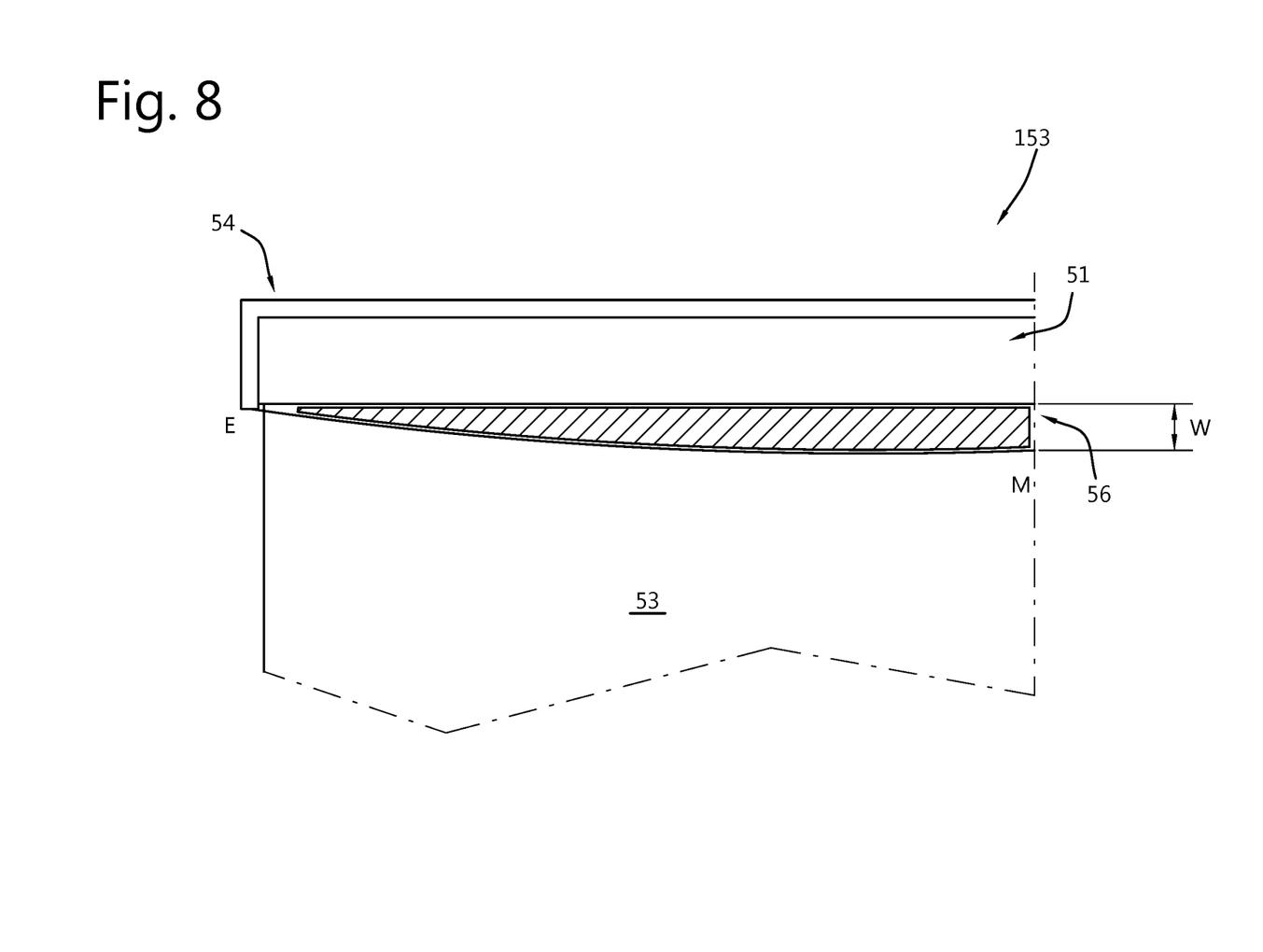
FIG. 8 illustrates how the auxiliary element can help to compensate for tolerances like e.g. deformation of the support frame according to an embodiment of the present invention.
Figure 9A:
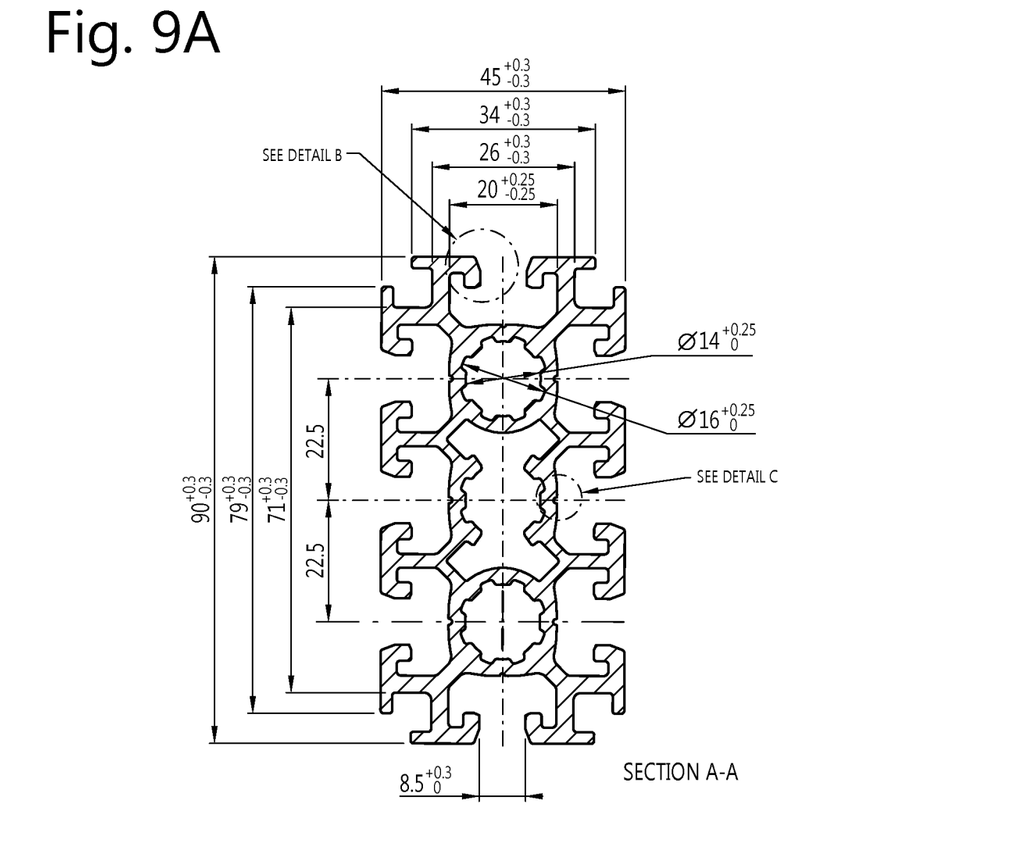
Figure 9B:
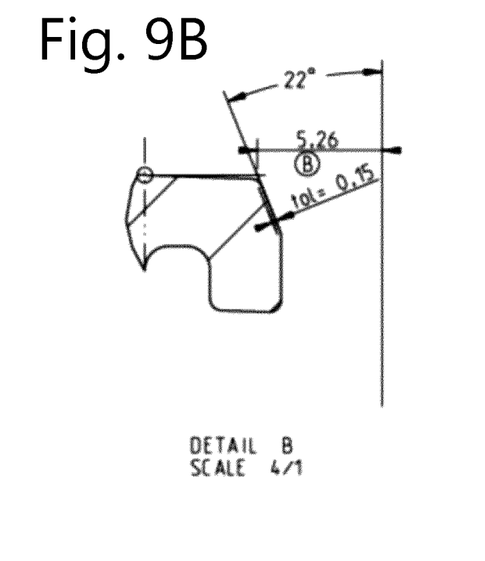
Figure 9C:
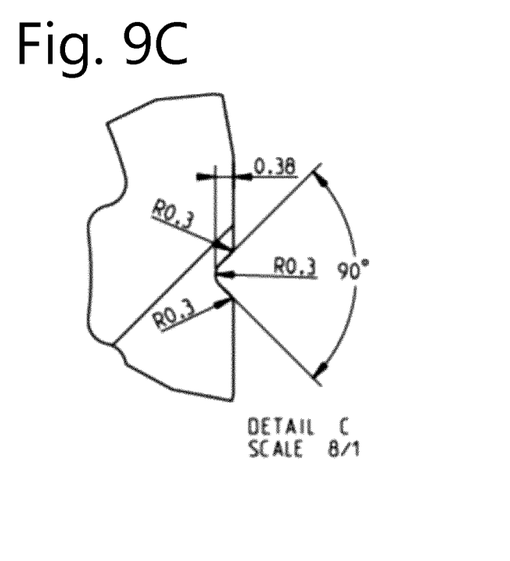
Figure 9D:
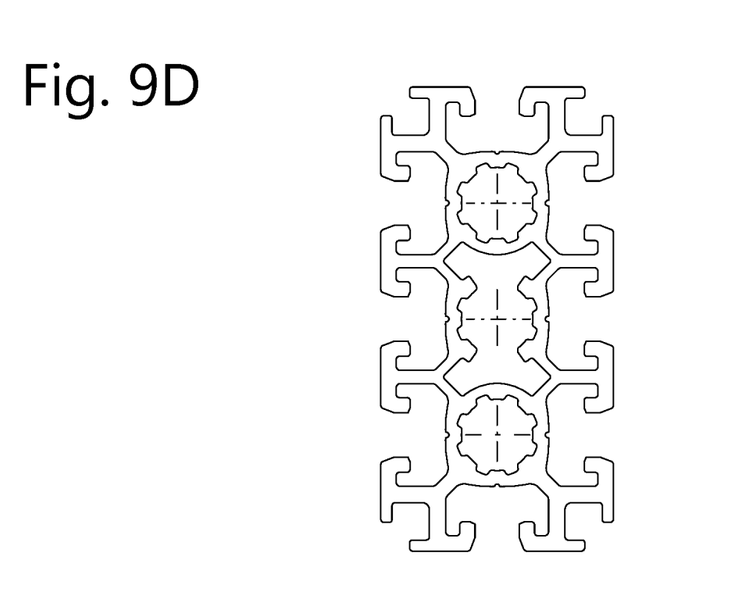
Figure 9E:
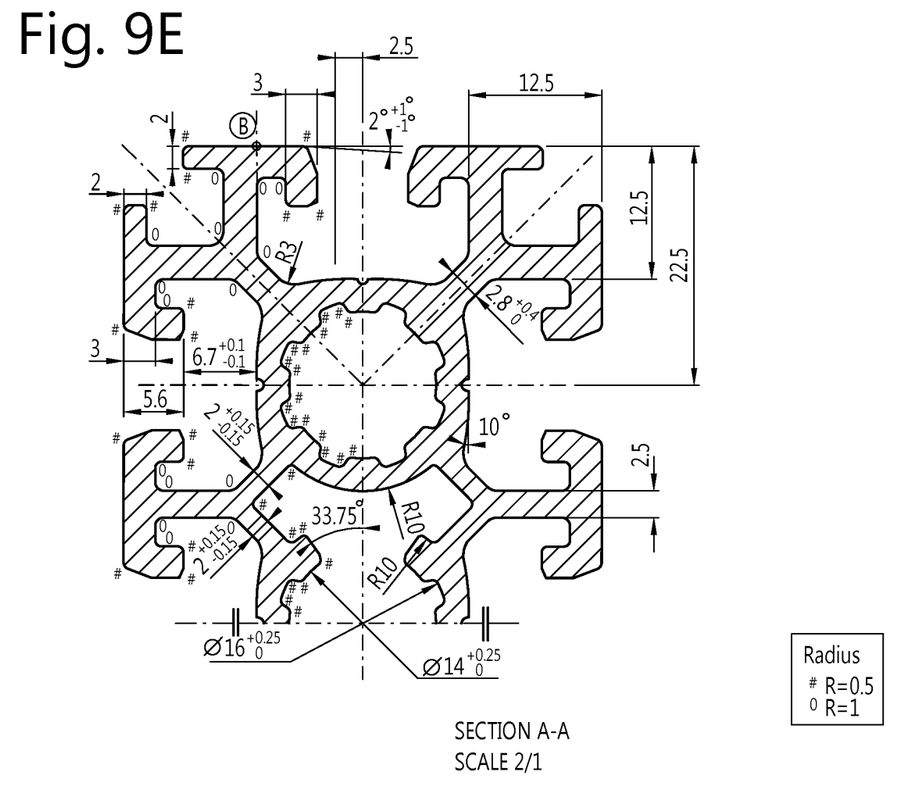

In the example of FIG. 8, the support structure is strained, resulting in differences in height along the length of the track or groove 55. In the example of FIG. 8, deflection of an upper frame member is maximum at e.g. position M. The difference in "height" between the extremity E and the position M along the edge of the track can be compensated, at least in part, by a compression of the auxiliary element 56. The auxiliary element 56 will be more compressed close to the extremity E and will be less and less compressed as one gets closer to the position M along the edge of the fabric/projection screen 53.

To fulfill that role, the auxiliary element 56 can be pressed on by the cord 51.

FIG. 9 shows the cross section of an example of extruded truss that can be used for the frame that will support the projection screen.

With the groove dimensioned as on FIG. 9, the cord can have a diameter of 7 mm and the auxiliary element can be a polyurethane tube with an external diameter of 8 mm and an internal diameter of 5 mm. The cord can be flexible polyvinyl chloride. The modulus of elasticity (E-modulus) can be determined by tensile testing according to DIN EN ISO 527-1A, using a test specimen at a testing speed of 1 mm/min. A suitable range showing rubber like properties is 1 to 10 MPa.

The auxiliary element 56 can be easier to squeeze than the cord 51. If the auxiliary element 56 is a cord rather than a hollow tube, the material from which it is made can have a lower E-modulus than the material of the cord 51. This is advantageous if the cord is fitted in the groove while the frame (on which the screen is fastened) is large and/or if the frame is already mounted. Indeed, an auxiliary element with a length of one meter or more and that is as flexible, as e.g. a polyurethane tube, is easier to carry up a ladder than a rigid tube of the same length made out of plastic or metal.

In a second aspect of the invention, the length of at least two sides of the support frame can be adjusted by an adjustment mechanism. The adjustment mechanism 103 can be e.g. a screw between a first part 101 and a second part 102 of the truss or truss assembly that form one side of the support frame. The screw 103 keeps the first part and second part of the truss together and at the same time determines the distance between them. This is illustrated on FIG. 10.

Figure 11:
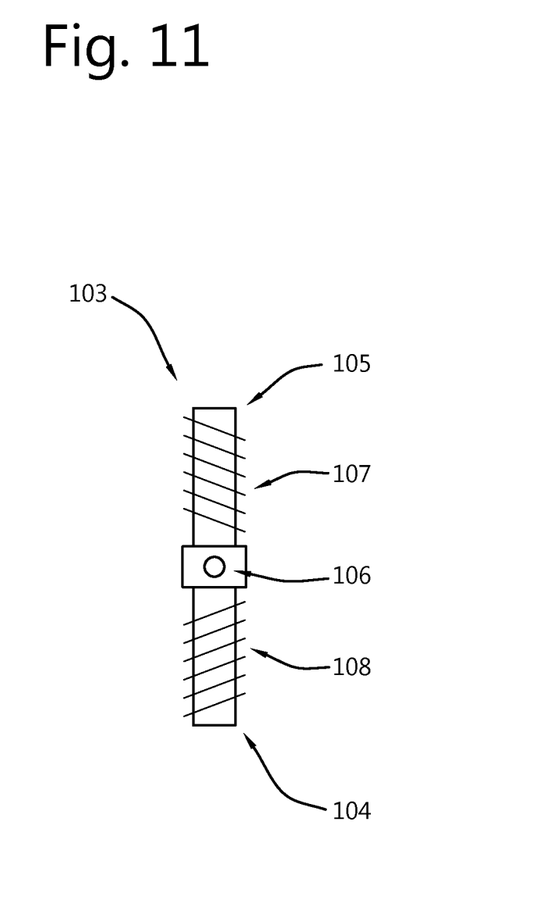
FIG. 11 shows a detail of the adjustment mechanism according to an embodiment of the present invention.

FIG. 11 details an example of adjustment mechanism 103. Adjustment mechanism 103 can be threaded. The thread should be long enough to keep the first and second parts 101 and 102 together after the tensioning of the screen.

The adjustment mechanism 103 has a first part 104 and a second part 105. Both the first part 104 and the second part 105 are fastened together, i.e. they form a solid.

The first part 104 and the second part 105 are threaded. The thread 108 in the first part 104 and the thread 107 of the second part 105 are oriented so that when the first and second part rotate together, both will be pulled into or pushed out of threaded holes in the first and second part 101 and 102.

The first and second part 104 and 105 can be rotated by e.g. engaging a lever (not shown) in an opening 106 situated e.g. between the first part 104 and the second part 105.

Several adjustment mechanisms can be used in a tensioning frame, for instance one adjustment mechanism per side of the frame. The adjustment mechanisms can be hand cranked or motorized. At least two adjustment mechanisms are used: one adjustment mechanism for two sides of the frame opposite to each other as illustrated on FIG. 12. The frame 120 has a lower frame member 121 and an upper frame member 122. The frame 120 has a left frame member 123 and a right frame member 124.

Figure 12:
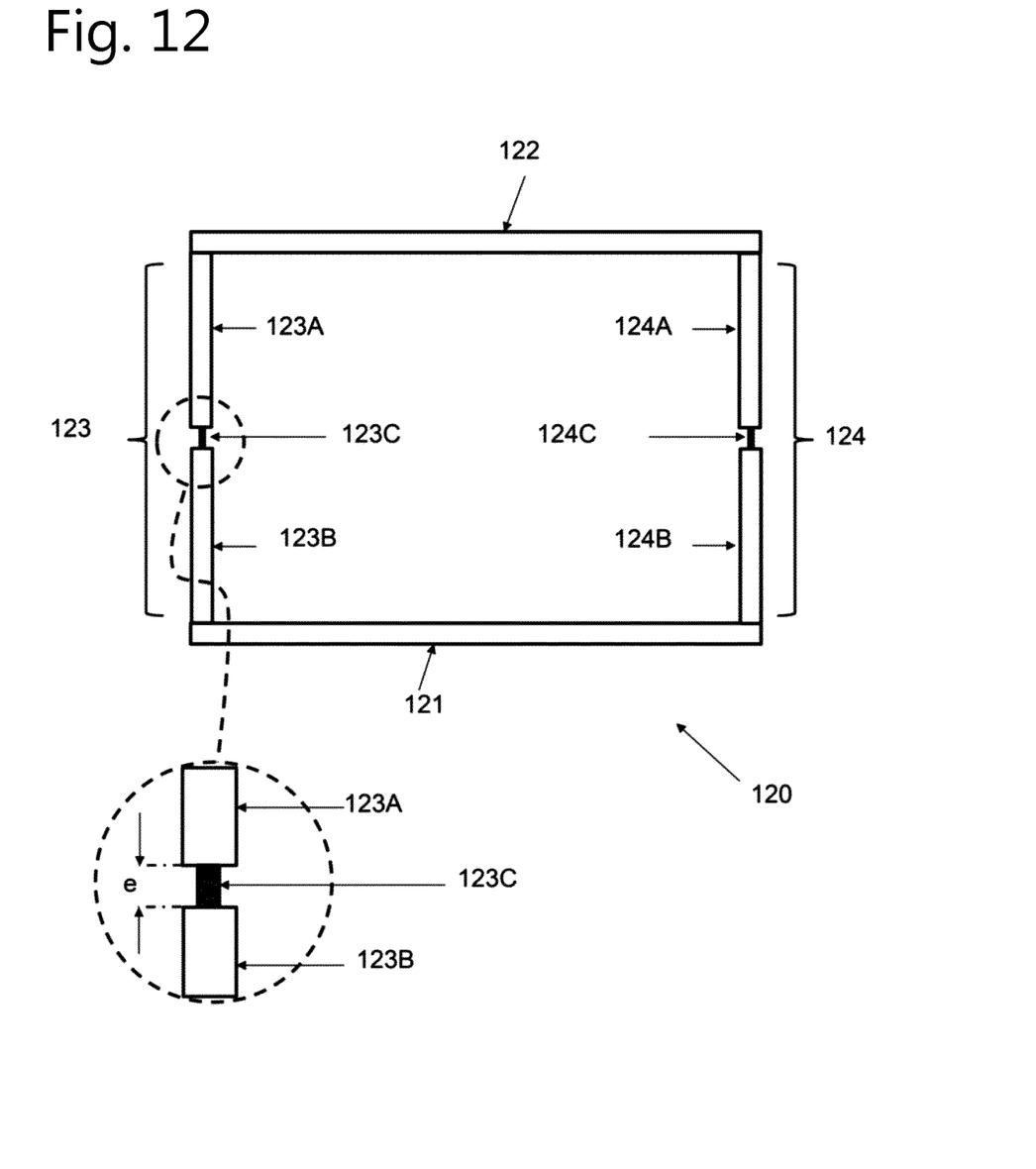
FIG. 12 shows a schematic representation of a support frame with adjustment mechanism on two opposite sides of the support frame according to an embodiment of the present invention.

The left frame member 123 has a first part 123A and a second part 123B. The first part 123A and second part 123B are kept together with an adjustment mechanism 123C that can adjust the distance e between the first part 123A and the second part 123B of the left frame member 123.

In any of the embodiments of the present invention the projection screen is tensioned in the range of tension 3 N/cm to 100 N/cm, typically in the range of tension 6 N/cm to 20 N/cm. These tension values are in the direction of tensioning, not perpendicular to the tensioning direction when two opposite sides such as right and left sides of the screen are free. If the tension is applied from top and the bottom of the screen, the tension is measured in the up-down directions.

Figure 10:
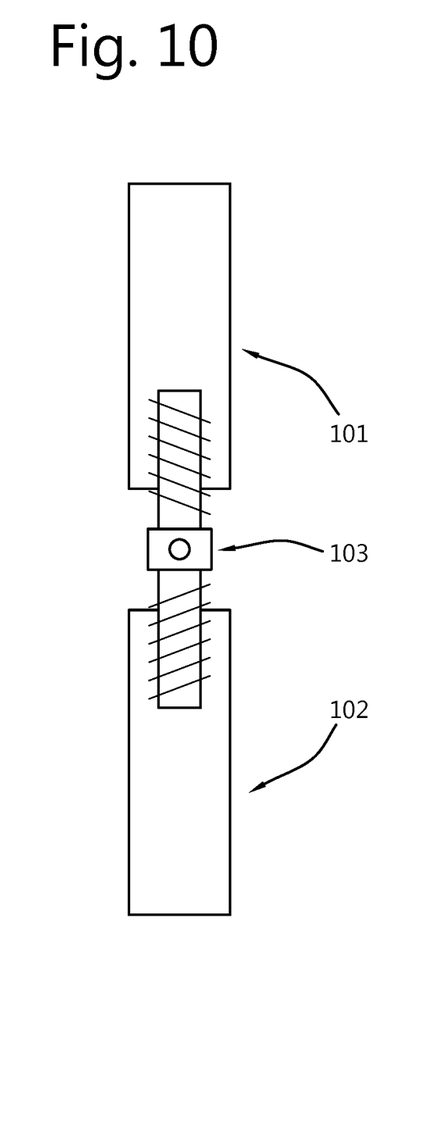
FIG. 10 shows an adjustment mechanism to adjust the length of the side of a support frame and the tension in the projection screen supported to the support frame according to an embodiment of the present invention.

To increase the tension in the projection screen, the distance between a first part 101 and a second part 102 of a truss is increased on e.g. two opposite sides of the frame.

The projection screen is preferably tensioned in two directions (a first direction parallel to the left and right frame members and a second direction parallel to the upper and lower frame members). In that case, each frame member (upper, lower, left and right frame member) has an adjustment mechanism. The range of tension in each direction can be 3 N/cm to 100 N/cm, typically in the range of tension 6 N/cm to 20 N/cm, for example.

The present invention also includes a method of constructing the projection screen on site. Before shipment, the perimeter frame can be dismantled into parts, for example, and the projection screen, can be supplied as a separate item that is rolled up. The perimeter frame includes an upper frame member, a lower frame member, a left frame member and a right frame member. In at least two of the frame members there is a groove or track. Each of the frame members can be an assembly of two or more smaller elements or pieces like e.g. trusses.

The projection screen is provided with fastening edges on at least two opposite sides, and the projection screen can be fastened to the perimeter frame by inserting the fastening edge in the groove or track of a frame member. An auxiliary element can be inserted or "stuffed" in the groove or track next to a fastening edge, to prevent the fastening edge from exiting the groove.

The projection screen can be hung from the upper frame member of the perimeter frame using at least two straps on an edge of the projection screen.

The fabric or projection screen can be securely attached to the fastening edge of the projection screen using an elongate bead of wire or plastic encapsulated in a length of fabric disposed along an edge of the projection screen.

By adjusting the total length of the frame member, the tension in the projection screen can be adjusted. For this purpose, at least a pair of frame members opposite to each other have an adjustment mechanism.

In any of the embodiments of the present invention, the fabric 53 or the projection screen 153 can be made from a screen material such as used in screen printing, e.g. a silk screen fabric. The fabric is made of threads. Hence, a rear projection screen according to embodiments of the present invention can be made of a fabric 53, e.g. a fabric as is used for silk screens in silk screen printing.

A projection screen according to embodiments of the present invention, as described above for any of the embodiments, can be produced from all the same material or from different materials and with different techniques with, for example, different threads or forms of threads including an option to use, multithreaded fibers or monofilaments. A projection screen according to embodiments of the present invention can be produced as in U.S. Pat. No. 9,612,517 which is incorporated by reference.

Materials for a projection screen are disclosed in US2010/0053748, for example, which is incorporated by reference. A projection screen according to embodiments of the present invention can be produced with thread. Such threads should ideally have good optical properties with thread densities and thread diameters which give a high modulus of elasticity, with a low creep or relaxation values. Threads can be formed from one or more opaque fibers or transparent fibers or light-permeable fibers. Threads may be selected which ensure a bright rear projection screen.

A thread can be formed from one or more synthetic fibers. Synthetic or natural polymer fibers or fiber mixtures can be used. The fabric 53 can be woven or non-woven. For example, threads can be made from a material selected from the group (not limiting) comprising:

polyester (PES), polyethylene terephthalate (PET), polyamide (PA), aramid or combinations thereof, polyacrylonitrile (PAN), polytetrafluoroethylene, polyethylene (PE), polypropylene (PP), polyvinyl chloride or combinations thereof, polyurethane (EL), metal threads or fibres, synthetic threads or fibres, or mineral threads or fibres such as glass fibre.

Multiple fibre types can be included in a thread or multiple thread types having different fibre types can be used in a projection screen.

According to embodiments of the present invention, the projection screen can be made by woven or non-woven techniques applied to fibres, e.g. in the form of threads. For example, a surface layer can be applied to an underlying woven or non-woven textile or fabric as described above with reference to fabric 53. The surface layer can, for example, be laminated to the underlying woven or non-woven such as to a fiberglass fabric (e.g. having a gain of 1.0). For example, the projection screen can be made from a woven fiberglass backing with a reflective surface, e.g. a vinyl reflective surface. According to embodiments of the present invention, microscopic glass beads can be applied on or with the surface to be viewed (e.g. a gain from 0.5 to 2.5 depending on the viewing angle). According to other embodiments, the screen can be made of a white material (e.g. with a gain of 1.0 or from 0.4 to 2.2, depending on the viewing angle) or light gray material (e.g. a gain of 0.6 to 0.9, depending on the viewing angle). Such a white material can be a vinyl material without a backing.

Preferably, the projection screen is free of deformations, blemishes or printed markings or other markings. A projection screen according to embodiments of the present invention can be used for front or rear projection, but the latter is preferred. According to embodiments of the present invention, the projection screen can withstand finger pointing and, hence, is preferably under tension and can be a rigid screen so as to avoid deformation of the image if a finger is pressed on screen, or to avoid the effect of wind that may push on the screen.

A projection screen according to embodiments of the present invention can have a thread density greater than twelve threads per millimetre, and the thread density can be less than 35 threads per millimetre, or less than 25 threads per millimetre. A projection screen in which the thread density is between 15 and 20 threads per millimetre, such as 18 threads per millimetre, or up to 20 threads per millimeter, can be used.

Embodiments of the present invention can use a thread diameter of less than 0.05 mm, preferably a thread diameter of greater than 0.01 mm. A thread diameter in the range between 0.02 mm and 0.04 mm, such as 0.03 mm can be used. The brightness of the projection screen and be increased by using threads with scattering properties. A coating can be applied which functions as a diffuser.

Embodiments of the invention can provide a projection screen with a mesh size of less than 0.15 mm, preferably less than 0.1 mm, preferably in the range from 0.05 mm to 0.07 mm, preferably 0.055 mm.

As explained in US2010/0053748, which is incorporated by reference, an open area is intended to refer to the percentage proportion of all open areas over the entire filtering surface of the fabric. It is generally calculated from the mean values of the mesh size and the effective thread width, that is to say, the maximum diameter of a thread in the interwoven state (in exceptional cases, if necessary, the maximum diameter of a thread in the non-interwoven state). A corresponding calculation formula is disclosed in paragraphs 37 to 40 of US20100053748, which are incorporated by reference.

As disclosed in US2010/0053748, an open area can be between 5% and 40% or an open area of between 7% and 25%, an open area of between 9% and 20% can be used. Examples can be an open area of 35% with twelve threads per millimetre and a thread diameter of 31 µm or an open area of 19.5% with 18 threads per millimetre and a thread diameter of 30 µm or an open area of 10% with 20 threads per millimetre and a thread diameter of 30 µm. These last values also set out particularly preferred developments of a textile screen.

In order to improve scatter properties of a projection screen and, hence, for example, to reduce laser induced speckle, a diffuser layer can be provided. This may impregnate the fabric and/or be applied thereto. In particular, a diffuser layer serves to fill and/or cover mesh openings of the fabric. An opaque coating and/or impregnation, in particular an opaque coating and/or impregnation of plastics material on and/or in the projection screen, has been found to be particularly advantageous. An impregnation of the fabric can be achieved, for example, by filling mesh openings of a fabric with an emulsion or the like. In the same manner, a fabric can additionally or alternatively be coated with a corresponding emulsion.

The diffusing material can improve the bond of the fabric to the diffusing material. An emulsion can be applied to the fabric. After drying the surface layer can become hard and can be opaque or partially transparent.

The image quality can be improved in rear projection by impregnation and/or coating with a diffusing layer. The application of a diffusing layer can improve the optical image quality and also the mechanical properties of the screen. Preferably, the diffusing layer can help to make a uniform image allowing a viewing angle of up to 180°.

The diffusing layer can formed as an opaque impregnated and/or coated layer. For example, an impregnation of the projection screen can advantageously be achieved via an application of an emulsion. Depending on requirements, the emulsion can be applied to fill any mesh openings and/or coated on the fabric. An emulsion can be applied as an aqueous emulsion with polyvinyl alcohol. The diffusing layer can be adapted, in particular in terms of modulus of elasticity and/or a creep rate of the fabric, and can improve the modulus of elasticity and/or a creep rate of the fabric. Polyvinyl alcohol is a water-soluble emulsifier. The emulsion can also have a wetting agent and/or a preservative. The wetting agent can increase the adhesive bond with the fabric formed by the threads. Alternatively, other methods to improve adhesion can be used such as corona discharge of plastics. The preservative preferably prevents fungal or bacterial growth.

A projection screen constructed in accordance with embodiments of the present invention can be sufficiently flexible to be tensioned in a suitable frame but can be rolled up for transport. It can be used as a rear projection screen. It can withstand long-term tensioning which makes a smooth uniform surface.

The diffusing layer can be formed by an impregnation and/or coating with an emulsion having a softening agent or an agent to improve elasticity. The emulsion can have a foaming agent. The diffusing layer can have partially light-permeable properties and light-diffusing scattering properties. Suitable foaming agents include, for example, soap. The diffusing layer can be formed e.g. by impregnation and/or coating on a fabric, for example with an additive which increases the water-resistance of the diffusing layer. The additive may be formed as a homo- or copolymer dispersion. A suitable additive can be based on acetate and/or ethylene and/or acryl ester and/or acrylate ester and/or acrylic acid ester. A reinforcement of the water-resistance can preferably also additionally or alternatively be achieved by means of an aldehyde or melamine or urea resin.

The diffuser layer can be made with an emulsion that has a hardening agent, in particular an acid and/or an isocyanate.

The emulsion may also have a luminescent and/or phosphorescent additive. In particular, a colour neutrality may be maintained or, if desired, a deviation from the colour neutrality may be consciously accepted.

The projection screen is preferably tensioned in two directions (a first direction parallel to the left and right frame members and a second direction parallel to the upper and lower frame members). In that case, each frame member (upper, lower, left and right frame member) has an adjustment mechanism. The range of tension in each direction can be 8 N/cm to 12 N/cm, for example. 6 N/cm to 20 N/cm, can for example, also be a suitable tension. The range of tension in each direction can be 3 N/cm to 100 N/cm, for example.

The present invention has the advantage that a large size projection screen can be shipped in a small size and weight by shipping to site or stored as a kit of parts comprising projection screen apparatus, the kit comprising a perimeter frame and a projection screen, wherein the perimeter frame includes an upper frame member, a lower frame member, a left frame member and a right frame member, wherein at least two of the frame members have a groove or track, and the projection screen has fastening edges on at least two opposite sides for fastening the projection screen to the perimeter frame by inserting the fastening edge in the groove or track of a frame member, and the projection screen apparatus being characterized in that an auxiliary element can be inserted in the groove or track next to a fastening edge, to prevent the fastening edge from exiting the groove.

In any of the embodiments, the frame can be modular. Any of the frame members can be made of two or more pieces which fit together. For example, depending on the length of right and left frame members, the upper and lower frame members can be made in two or more pieces for easy transportation.

The invention claimed is:

1. A projection screen apparatus comprising a perimeter frame and a projection screen,
    wherein the perimeter frame includes an upper frame member, a lower frame member, a left frame member and a right frame member,
    wherein at least two of the frame members have a groove or track,
    wherein the projection screen has fastening edges on at least two opposite sides for fastening the projection screen to the perimeter frame by inserting each fastening edge in the groove or track of a frame member, and
    the projection screen apparatus including an auxiliary element inserted in the groove or track next to a fastening edge to prevent the fastening edge from exiting the groove,
    wherein the fastening edge and the auxiliary element are pressed against each other by the walls of the groove.

2. The projection screen apparatus according to claim 1, wherein the auxiliary element compensates for tolerances or deformations of the frame members, or wherein the auxiliary element is closer to the center of the projection screen than the fastening edge which is in the same track or groove or wherein the auxiliary element is not encapsulated by the projection screen.

3. The projection screen apparatus according to claim 1, wherein an edge of the projection screen has at least means for hanging the projection screen to the upper frame member of the perimeter frame, or wherein an edge of the projection screen has a mechanical support and the mechanical support and the auxiliary element are rotatable to each other.

4. The projection screen apparatus according to claim 1, wherein the fastening edge of the projection screen comprises an elongate bead of wire or plastic encapsulated in a length of fabric disposed along an edge of the projection screen and securely attached to the fabric or projection screen.

5. The projection screen apparatus according to claim 1, wherein the groove or track has a width that is the same as or larger than a width of the wire or plastic of the fastening edge.

6. The projection screen apparatus according to claim 1, the auxiliary element is selected from one or more of:
    a solid cylinder of compliant material,
    a hollow cylinder of compliant material,
    a piece of polyurethane or rubber,
    a mechanical structure that locks the projection screen in the groove.

7. The projection screen apparatus according to claim 1, wherein at least a pair of frame members opposite to each other have an adjustment mechanism to adjust the total length of the frame member and the tension in the projection screen.

8. A method of making a projection screen apparatus comprising:
    obtaining a perimeter frame and a projection screen, wherein the perimeter frame includes an upper frame member, a lower frame member, a left frame member and a right frame member,
    forming in at least two of the frame members a groove or track,
    wherein the projection screen has fastening edges on at least two opposite sides, the method comprising further fastening the projection screen to the perimeter frame by inserting the fastening edge in the groove or track of a frame member, and
    inserting an auxiliary element in the groove or track next to a fastening edge, to prevent the fastening edge from exiting the groove,
    wherein the fastening edge and the auxiliary element are pressed against each other by the walls of the groove.

9. The method according to claim 8, further comprising hanging the projection screen to the upper frame member of the perimeter frame using at least two straps on an edge of the projection screen.

10. The method according to claim 8, further comprising securely attaching to the fabric or projection screen the fastening edge of the projection screen using an elongate bead of wire or plastic encapsulated in a length of fabric disposed along an edge of the projection screen.

11. The method according to claim 8, further comprising forming the groove or track with a width that is the same as or larger than a width of the wire or plastic of the fastening edge.

12. The method according to claim 8, wherein the auxiliary element is selected from any of:
    a solid cylinder of compliant material,
    a hollow cylinder of compliant material,
    a piece of polyurethane or rubber,
    a mechanical structure that locks the projection screen in the groove,
    a piece to be located closer to the center of the projection screen than the fastening edge which is in the same track or groove,
    a piece to compensate for tolerances or deformations of the frame members,
    a mechanical structure that is not encapsulated by the projection screen,
    a mechanical structure that locks the projection screen in the groove.

13. The method according to claim 8, comprising adjusting the total length of the frame member and the tension in the projection screen.

14. The method according to claim 13, wherein at least a pair of frame members opposite to each other have an adjustment mechanism.

15. A method of constructing a projection screen on site, comprising:
    providing a perimeter frame as a kit of parts with a projection screen, the perimeter frame including an upper frame member, a lower frame member, a left frame member and a right frame member, wherein in at least two of the frame members there is a groove or track, the projection screen being provided with fastening edges on at least two opposite sides, and fastening the projection screen to the perimeter frame by inserting the fastening edge in the groove or track of a frame member, wherein an auxiliary element is insertable in the groove or track next to a fastening edge, to prevent the fastening edge from exiting the groove, and wherein the fastening edge and the auxiliary element are pressed against each other by the walls of the groove.

16. A kit of parts comprising projection screen apparatus, the kit comprising a perimeter frame and a projection screen, wherein the perimeter frame includes an upper frame member, a lower frame member, a left frame member and a right frame member, wherein at least two of the frame members have a groove or track, wherein the projection screen has fastening edges on at least two opposite sides for fastening the projection screen to the perimeter frame by inserting the fastening edge in the groove or track of a frame member, and the projection screen apparatus including an auxiliary element can be inserted in the groove or track next to a fastening edge, to prevent the fastening edge from exiting the groove, wherein the fastening edge and the auxiliary element are pressed against each other by the walls of the groove.

17. The kit of parts according to claim 16, wherein an edge of the projection screen has at least two straps for hanging the projection screen to the upper frame member of the perimeter frame.

18. The kit of parts according to claim 16, wherein the fastening edge of the projection screen comprises an elongate bead of wire or plastic encapsulated in a length of fabric disposed along an edge of the projection screen and securely attached to the fabric or projection screen.

19. The kit of parts according to claim 16, wherein the groove or track has a width that is the same as or larger than a width of the wire or plastic of the fastening edge.

20. The kit of parts according to claim 16, wherein the auxiliary element is selected from:
   a solid cylinder of compliant material,
   a hollow cylinder of compliant material,
   a piece of polyurethane or rubber,
   a piece to be placed closer to the center of the projection screen than the fastening edge which is in the same track or groove,
   a mechanical structure that is not encapsulated by the projection screen,
   a mechanical structure that locks the projection screen in the groove.

21. The kit of parts according to claim 16, wherein at least a pair of frame members opposite to each other have an adjustment mechanism to adjust the total length of the frame member and the tension in the projection screen.

\* \* \* \* \*